United States Patent Office 3,634,543
Patented Jan. 11, 1972

3,634,543
NUCLEATED GRAFT POLYMERS OF POLY-
CAPROLACTAM ON CARBOXY CONTAIN-
ING COPOLYMERIC BACKBONE
Norman Sherman, Rockaway, N.J., assignor to Allied
Chemical Corporation, New York, N.Y.
No Drawing. Filed Aug. 12, 1968, Ser. No. 751,767
Int. Cl. C08g 41/04
U.S. Cl. 260—857 R
7 Claims

ABSTRACT OF THE DISCLOSURE

Nucleated compositions of polycaprolactam having improved ultimate elongation may be prepared by polymerizing caprolactam in the presence of about 0.1 to 1.5% by weight of a copolymer of an olefin and an unsaturated carboxylic acid, and adding thereto a nucleating agent. The resulting composition is a graft polymer wherein the copolymer forms the backbone chain and polycaprolactam forms the side chains. Except for ultimate elongation, the physical properties of the nucleated composition are similar to those of nucleated polycaprolactam homopolymer. The ultimate elongation of the composition is much greater than that of nucleated polycaprolactam homopolymer.

BACKGROUND OF THE INVENTION

This invention relates to a nucleated graft polymer of polycaprolactam and a copolymer of an olefin and an unsaturated carboxylic acid.

It is known that the physical properties of polyamides, particularly polycaprolactam, more commonly known as nylon 6, may be improved for certain applications by the addition of small amounts of a nucleating agent. By nucleating agent is meant finely divided material which provides nuclei for the formation of spherulites and upgrades the crystallinity of the resulting composition. The incorporation of such additives with nylon 6 enhances certain physical properties of the polymer, particularly strength, stiffness and moldability.

One property which is not enhanced, but rather is diminished, by the incorporation of nucleating agents with nylon 6 is ultimate elongation. The ultimate elongation of nucleated nylon 6 is only about one-fifth that of unmodified nylon 6.

Ultimate elongation is an important property of a plastic. It is an indication of a plastic's toughness. Although "toughness" has not been given an exact definition, it is generally recognized as being the work required to rupture a sample. This work, in turn, may be determined by measuring the area under the stress-strain curve for the sample to the point of break. The coordinates of the stress-strain curve are tensile stress and percent elongation, with the coordinates at the point of break being ultimate tensile strength and ultimate elongation. Hence, ultimate elongation is one of two parameters which may be used to indicate toughness.

It is an object of this invention to provide novel compositions of nucleated nylon 6 having improved ultimate elongation and, as a result, improved toughness.

SUMMARY OF THE INVENTION

It has been discovered, in accordance with this invention, that compositions of nucleated nylon 6 having improved ultimate elongation may be prepared by polymerizing caprolactam or 6-aminocaproic acid hydrolytically in the presence of about 0.1 to about 1.5% of a copolymer of an olefin and an unsaturated carboxylic acid or ester or salt thereof, and incorporating therein a nucleating agent. Except for ultimate elongation, the physical properties of the composition thus prepared are similar to those of nucleated nylon 6. The ultimate elongation of the composition is similar to that of unmodified nylon 6.

The acid functional groups of the copolymer provide reactive sites through which grafting occurs. Hence, the product of the polymerization reaction is a graft polymer wherein the copolymer forms the backbone chain and polycaprolactam forms the side chains. However, because of the small amount of copolymer which is added to the caprolactam melt, it is possible that some of the polycaprolactam which is formed may be ungrafted.

Copolymers suitable to form the backbone of the graft polymer of the invention are well known and are readily available commercially. They may be prepared from polymerizable α-olefins of up to 10 carbon atoms and unsaturated acids such as acrylic acid and methacrylic acid or alkyl esters thereof. Salts of the acids may also be used. To provide sufficient distance between adjacent polyamide grafts, the olefin should be the major repeating unit of the copolymer.

The composition of the invention, therefore, is a graft polymer having a copolymeric backbone chain having a major repeating unit of the formula

wherein R is selected from the group consisting of hydrogen and alkyl radicals of up to 8 carbon atoms, and a minor repeating unit of the formula

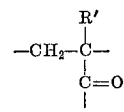

wherein R' is hydrogen or methyl, the ethylenic linkages are in the backbone chain, and the carbonyl group is attached to a polyamide graft chain of the formula

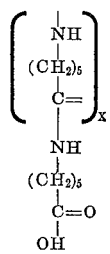

wherein x is a cardinal number of at least 1, said copolymeric backbone chain constituting from about 0.1 to about 1.5% by weight of the graft polymer; and, dispersed in the graft polymer, a nucleating agent.

The nucleating agent may be incorporated into the composition at any time, either after polymerization or before, such as by adding it to the caprolactam monomer. Nucleating agents which substantially upgrade the crystallinity of nylon 6 compositions are well known. Magnesium silicate, or talc, is typical and widely used. Other suitable nucleating agents are disclosed in my copending application Ser. No. 641,168, filed May 25, 1967 now abandoned in favor of a continuation application Ser. No. 002,361, filed Jan. 12, 1970, and include metal oxides, silicates, phenylphosphonates, stearates, halides and naphthenates. The nucleating agent should be present in an amount from 0.05 to 10%, by weight based on the polymer, and have a particle size of less than 40 microns.

At the concentrations employed herein, the copolymer is miscible with molten caprolactam. Hence, the composition of the invention may be prepared using any hydrolytic polymerization process suitable for preparing polycaprolactam. A typical hydrolytic polymerization process for polycaprolactam is described in U.S. Pat. 3,090,773.

A process for polymerizing caprolactam hydrolytically in the presence of a copolymer such as the one employed in this invention is disclosed in U.S. Pat. 3,388,186. The patent is directed to the preparation of graft polymers wherein the polycaprolactam moiety ranges from 10 to 98%, and discloses that, in general, such polymers have physical properties which reflect the relative proportions of the respective components. However, from the examples in the patent, it appears that the ultimate elongation of the graft polymers prepared therein bears no set relationship to the amount of copolymer present. It is therefore surprising, in view of this patent, that the addition of the copolymer should have such a profound effect on ultimate elongation in this invention.

DESCRIPTION OF THE PREFERRED EMBODIMENTS

Although any polymerizable olefin may be used to prepare the copolymer which forms the backbone of the graft polymer of the invention, the extra carbon atoms of the olefin do not contribute to the results obtained herein, so lower olefins of 2 to 4 carbon atoms are preferred. Ethylene is especially preferred.

The unsaturated carboxylic acid used to prepare the copolymer may be acrylic acid, methacrylic acid or alkyl, preferably methyl or ethyl, esters thereof. The acid unit should constitute from 1 to 50 mol percent, preferably 5 to 20 mol percent, of the copolymer.

Improvement in ultimate elongation is observed when the amount of copolymer added to the caprolactam melt is about 0.1%. The addition of more than about 1.5% tends to adversely affect other properties of the composition, such as tensile strength, without further increasing significantly ultimate elongation. Optimum results are obtained when the amount of copolymer added is about 0.5%.

The following examples further illustrate the invention.

EXAMPLE 1

Nine grams of finely divided $MgSiO_3$ and 14.5 grams of a copolymer of ethylene and acrylic acid having a number average molecular weight of about 35,000 and containing about 6 mol percent acrylic acid were dispersed in a molten mixture of 1680 grams of caprolactam and 108 grams of aminocaproic acid at 100° C. The temperature of the reaction mixture, which was under a nitrogen atmosphere, was raised to about 260° C. The reaction mixture was maintained at that temperature, with stirring, for about 14 hours and then extruded to form strands which were quenched in water and pelletized. The pellets were molded into bars which had the physical properties indicated in Table 1.

EXAMPLE 2

The procedure of Example 1 was followed, except 9 grams of a copolymer of ethylene and ethyl acrylate was used which had a number average molecular weight of 20,000 and contained about 5 mol percent ethyl acrylate. Results are tabulated in Table 1.

Control

To compare the compositions of Examples 1 and 2 with nucleated caprolactam homopolymer, the procedure of Example 1 was followed except no copolymer was added to the melt (Control A). To compare the compositions with unmodified nylon 6, the procedure of Example 1 was followed except neither copolymer nor $MgSiO_3$ was added to the melt (Control B). The properties of control samples A and B are reported in Table 1.

TABLE 1

| | Control | | Examples | |
|---|---|---|---|---|
| | A | B | 1 | 2 |
| Yield stress, p.s.i. | 13,100 | 11,800 | 11,700 | 12,500 |
| Ultimate tensile strength, p.s.i. | 12,800 | 11,800 | 11,700 | 12,500 |
| Yield elongation, percent | 6.5 | 6.3 | 6.6 | 7.1 |
| Ultimate elongation, percent | 40 | 200 | 172 | 164 |
| Flexural strength, p.s.i. | 16,380 | 15,600 | 16,400 | 17,200 |
| Flexural modulus | 545,000 | 470,000 | 520,000 | 531,000 |
| Impact strength (Izod) at 50 percent R.H. 73° F., ft. lb./in. notch | 1.0 | 1.2 | 1.5 | 1.6 |
| Izod at −40° F., ft. lb./in. notch | 0.6 | 0.8 | 1.0 | 1.0 |

I claim:
1. A composition comprising
   (a) a graft polymer having a copolymeric backbon chain having a major repeating unit of the formula

wherein R is selected from the group consisting of hydrogen and alkyl radicals of up to 8 carbon atoms, and from 1 to 50 mol percent of the copolymer of a repeating unit of the formula

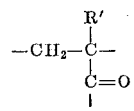

wherein R' is hydrogen or methyl, the ethylenic linkages are in the backbone chain, and the carbonyl group is attached to a polyamide graft chain of the formula

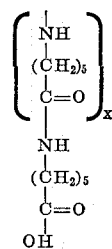

wherein $x$ is a cardinal number of at least 1, said copolymeric backbone chain constituting from about 0.1 to about 1.5% by weight of the graft polymer, and
   (b) dispersed in the graft polymer from 0.05 to 10% by weight based on the polymer of a nucleating agent.

2. The composition of claim 1 wherein R is an alkyl radical of up to 2 carbon atoms.

3. The composition of claim 1 wherein the minor repeating unit constitutes from 5 to 20 mol percent of the copolymeric backbone chain.

4. The composition of claim 1 wherein R is hydrogen.

5. The composition of claim 4 wherein R' is hydrogen.

6. The composition of claim 1 wherein the nucleating agent is selected from the group consisting of metal oxides, silicates, phenylphosphinates, stearates, halides, and naphthenates.

7. The composition of claim 6 wherein the nucleating agent is present in an amount from 0.05 to 10% and has a particle size of less than 40 microns.

References Cited

UNITED STATES PATENTS

| | | | |
|---|---|---|---|
| 3,080,345 | 3/1963 | Brooks | 260—78 |
| 3,214,414 | 10/1965 | Waltersperger | 260—78 |
| 3,388,186 | 6/1968 | Kray | 260—857 |

FOREIGN PATENTS

| | | | |
|---|---|---|---|
| 851,300 | 10/1960 | Great Britain | 260—78 |

PAUL LIEBERMAN, Primary Examiner

U.S. Cl. X.R.

260—78 R, 78 SC, 857 L

PO-1050
(5/69)

UNITED STATES PATENT OFFICE
CERTIFICATE OF CORRECTION

Patent No. 3,634,543   Dated January 11, 1972

Inventor(s) Norman Sherman

It is certified that error appears in the above-identified patent and that said Letters Patent are hereby corrected as shown below:

Column 1, line 43, "properly" should be --property--.

Column 2, the formula beginning at line 45 should read:

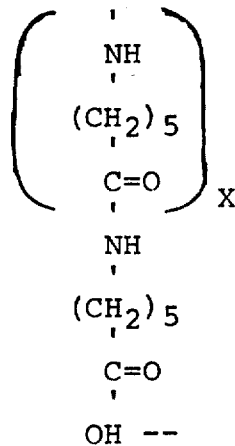

$$\left( \begin{array}{c} NH \\ (CH_2)_5 \\ C=O \end{array} \right)_x$$

NH
|
$(CH_2)_5$
|
C=O
|
OH --

Claim 1, (a) the word "backbon" should be --backbone--.

Signed and sealed this 8th day of August 1972.

(SEAL)
Attest:

EDWARD M. FLETCHER, JR.          ROBERT GOTTSCHALK
Attesting Officer                Commissioner of Patents